US010866656B2

(12) United States Patent
Toriihara et al.

(10) Patent No.: US 10,866,656 B2
(45) Date of Patent: *Dec. 15, 2020

(54) HANDHELD DISPLAY APPARATUS HAVING CONTACT PORTION PROXIMATE TO DISPLAY AND GRIP PORTION MANUALLY ATTACHABLE TO AND DETACHABLE FROM DISPLAY

(71) Applicant: CANON KABUSHIKI KAISHA, Tokyo (JP)

(72) Inventors: Shigeru Toriihara, Kawasaki (JP); Yuya Nagata, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/167,359

(22) Filed: Oct. 22, 2018

(65) Prior Publication Data

US 2019/0056798 A1 Feb. 21, 2019

Related U.S. Application Data

(63) Continuation of application No. 15/194,313, filed on Jun. 27, 2016, now Pat. No. 10,108,278.

(30) Foreign Application Priority Data

Jun. 30, 2015 (JP) .................................. 2015-132189

(51) Int. Cl.
*G06F 3/038* (2013.01)
*G06F 1/16* (2006.01)
(Continued)

(52) U.S. Cl.
CPC ......... *G06F 3/038* (2013.01); *G02B 27/0176* (2013.01); *G06F 1/1607* (2013.01);
(Continued)

(58) Field of Classification Search
CPC .............. G02B 27/0149; G02B 27/017; G02B 27/0172; G02B 27/0176; G02B 27/028;
(Continued)

(56) References Cited

U.S. PATENT DOCUMENTS

| 2012/0224318 A1* | 9/2012 | Carleton ................... A45F 5/00 |
| | | 361/679.26 |
| 2013/0120258 A1* | 5/2013 | Maus ...................... G06F 3/044 |
| | | 345/161 |

(Continued)

FOREIGN PATENT DOCUMENTS

| JP | H0483295 A | 7/1992 |
| JP | 2001075496 A | 3/2001 |

*Primary Examiner* — Nathan Danielsen
(74) *Attorney, Agent, or Firm* — Canon U.S.A., Inc. IP Division

(57) ABSTRACT

A handheld display apparatus including a display unit that displays an image includes a handheld grip portion including a plurality of bar members to be gripped by a user, and an operation unit that receives a manual operation and generates a control signal for the handheld display apparatus, the operation unit arranged on either at least one of the plurality of bar members or in proximity to at least one of the plurality of bar members.

27 Claims, 7 Drawing Sheets

(51) Int. Cl.
*G02B 27/01* (2006.01)
*G06F 3/033* (2013.01)

(52) U.S. Cl.
CPC ...... *G06F 3/033* (2013.01); *G02B 2027/0156* (2013.01); *G06F 2203/0384* (2013.01)

(58) Field of Classification Search
CPC ....... G02B 2027/015–0159; G02B 2027/0174; G06F 1/16; G06F 1/1601; G06F 1/1605; G06F 1/1607–1611; G06F 1/1613; G06F 1/1626; G06F 1/1628; G06F 1/1632; G06F 1/1633; G06F 1/1654; G06F 3/02; G06F 3/0202; G06F 3/0219; G06F 3/0224; G06F 3/0227; G06F 3/033; G06F 3/0338; G06F 3/0362; G06F 3/038; G06F 3/0414; G06F 2200/1635; G06F 2200/1636; G06F 2200/1637; G06F 2203/0384
See application file for complete search history.

(56) References Cited

U.S. PATENT DOCUMENTS

| | | | |
|---|---|---|---|
| 2014/0274394 A1* | 9/2014 | Willis | G06F 1/1632 463/37 |
| 2015/0234189 A1* | 8/2015 | Lyons | G02B 27/0172 345/174 |

* cited by examiner

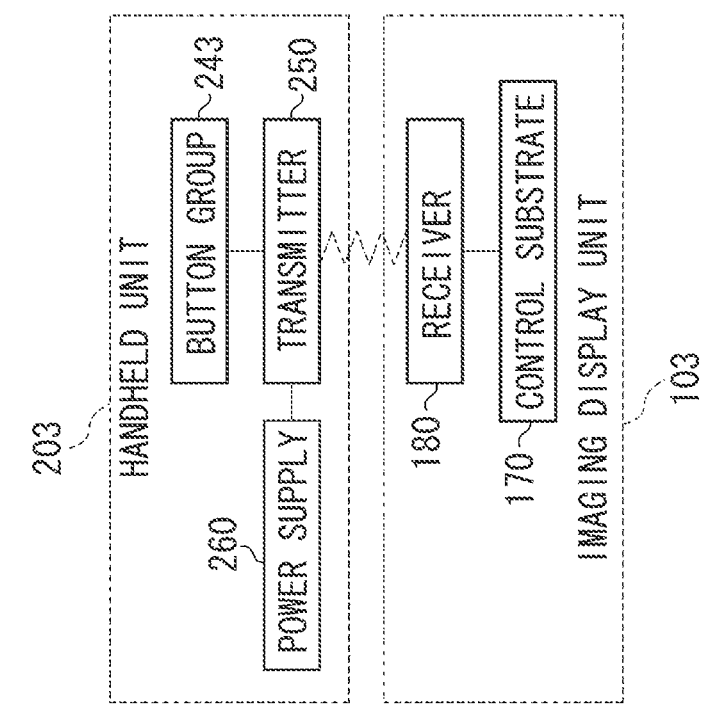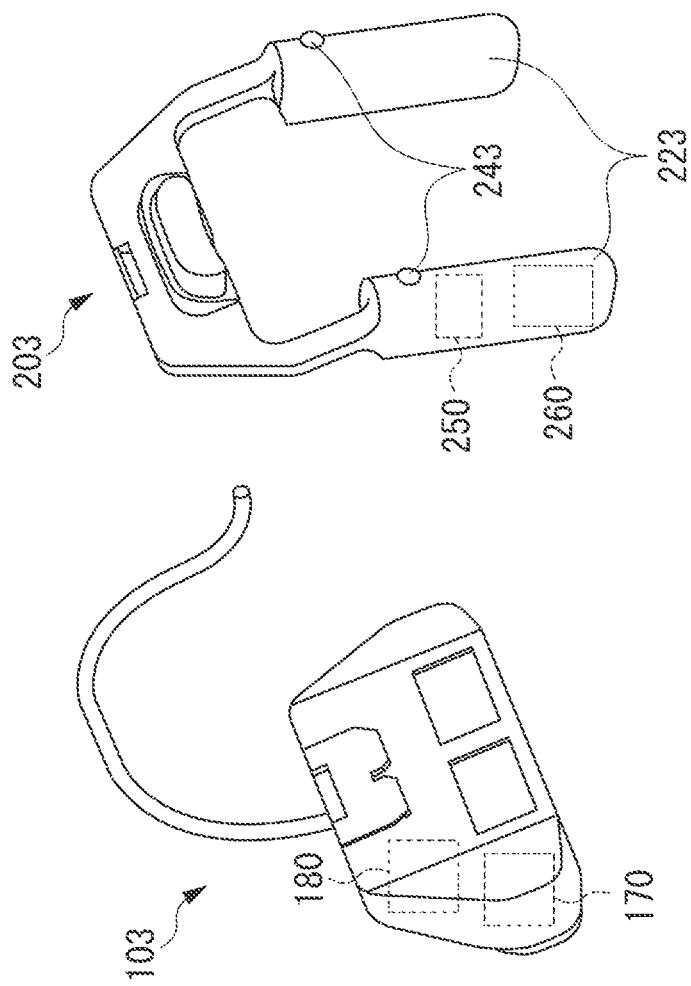

HANDHELD DISPLAY APPARATUS HAVING CONTACT PORTION PROXIMATE TO DISPLAY AND GRIP PORTION MANUALLY ATTACHABLE TO AND DETACHABLE FROM DISPLAY

CROSS-REFERENCE TO RELATED APPLICATIONS

This application is a continuation, and claims the benefit, of U.S. patent application Ser. No. 15/194,313 filed Jun. 27, 2016 (now U.S. Pat. No. 10,108,278), which claims the benefit of Japanese Patent Application No. 2015-132189, filed Jun. 30, 2015. Each of U.S. patent application Ser. No. 15/194,313 and Japanese Patent Application No. 2015-132189 is hereby incorporated by reference herein in its entirety.

BACKGROUND

Field

Aspects of the present invention generally relate to a handheld display apparatus that includes a display unit for displaying an image and a handheld grip portion including a plurality of bar members to be gripped by a user.

Description of the Related Art

Head mounted apparatuses (HMD) exist that include a display unit for displaying an image and are able to be mounted onto a user's head. The HMD can present a video image of, for example, a virtual object to a moving user. The HMD has recently come to be used in various fields.

If one HMD is used by a plurality of people, the HMD's mount portion needs to be adjusted each time a different user uses the HMD. This can impair the usability for the users.

Japanese Patent Application Laid-Open No. 2007-72120 discusses a handheld display apparatus as a technique for allowing a plurality of users to easily take turns using an apparatus including a display unit. The handheld display apparatus discussed in Japanese Patent Application Laid-Open No. 2007-72120 includes a display unit for displaying an image and a grip portion arranged under the display unit. To view the image on the display unit, the user grips the grip portion with both hands or with one hand and looks into the display unit. The display unit is positioned by the user by moving the handheld display apparatus while the user grips the grip portion. There is no need to adjust a mount unit in using the handheld display apparatus, thus, a plurality of users can easily take turns using the handheld display apparatus.

When a user uses the handheld display apparatus discussed in Japanese Patent Application Laid-Open No. 2007-72120, one or both of the user's hands are occupied and not available for purposes other than gripping the grip portion. As a result, while using the handheld display apparatus, if the user needs to provide a control instruction, such as powering the handheld display apparatus on or off, turning on or off of a display, adjust the display contrast, perform an error recovery, etc., the user needs to temporarily stop using the HMD, release the user's hand(s) from the grip portion, and perform the required operation. The need to stop using the handheld display apparatus each time a control instruction needs to be given can impair the user's usability of the handheld display apparatus. In addition, frequently releasing and then re-gripping the grip portion can cause an erroneous operation.

SUMMARY

Aspects of the present invention are generally directed to a technique for facilitating the issuance of a control instruction to a handheld display apparatus that includes a display unit for displaying an image to a user.

According to an aspect of the present invention, a handheld display apparatus including a display unit configured to display an image includes a handheld grip portion including a plurality of bar members to be gripped by a user and an operation unit configured to receive a manual operation and generate a control signal for the handheld display apparatus, the operation unit arranged on either at least one of the plurality of bar members or in proximity to at least one of the plurality of bar members.

Further features of the present invention will become apparent from the following description of exemplary embodiments with reference to the attached drawings.

BRIEF DESCRIPTION OF THE DRAWINGS

FIGS. 7A, 7B, and 7C are diagrams illustrating a mechanism for electrically wirelessly transmitting an operation performed on buttons on a handheld unit.

DESCRIPTION OF THE EMBODIMENTS

A handheld display apparatus according to an exemplary embodiment will be described below. The handheld display apparatus according to the present exemplary embodiment includes an imaging unit that captures an image of a real space as well as a display unit that displays an image to a user. In another embodiment, the handheld display apparatus can be configured to include only the display unit without the imaging unit.

When using the handheld display apparatus, the user is able to observe a scene in the direction of the user's line of sight via the imaging unit and the display unit.

Specific processing of the handheld display apparatus will now be described. The handheld display apparatus initially obtains a real space image captured by the imaging unit. The handheld display apparatus then superimposes, if needed, a virtual object (such as computer graphics) and/or another real space image on the obtained real space image. The handheld display apparatus finally presents the image that has undergone the superimposition processing to the user on the display unit. If the foregoing processing is performed at sufficiently high speed, a real-time video image can be displayed to the user. Specific suitable use cases include, but are not limited to, development use applications for evaluating parts without prototyping, practice use applications for rare disasters, entertainment use applications, etc.

The present exemplary embodiment is also applicable to a handheld display apparatus that does not include the imaging unit and the display unit and that stimulates a non-visual sensory organ of a user's head. For example, the present exemplary embodiment is applicable to a sound guide device for guiding a visually-challenged user by voice and a handheld display apparatus that includes a main body unit such as a device for artificially producing a smell to enhance reality of a virtual object.

Figure 1:
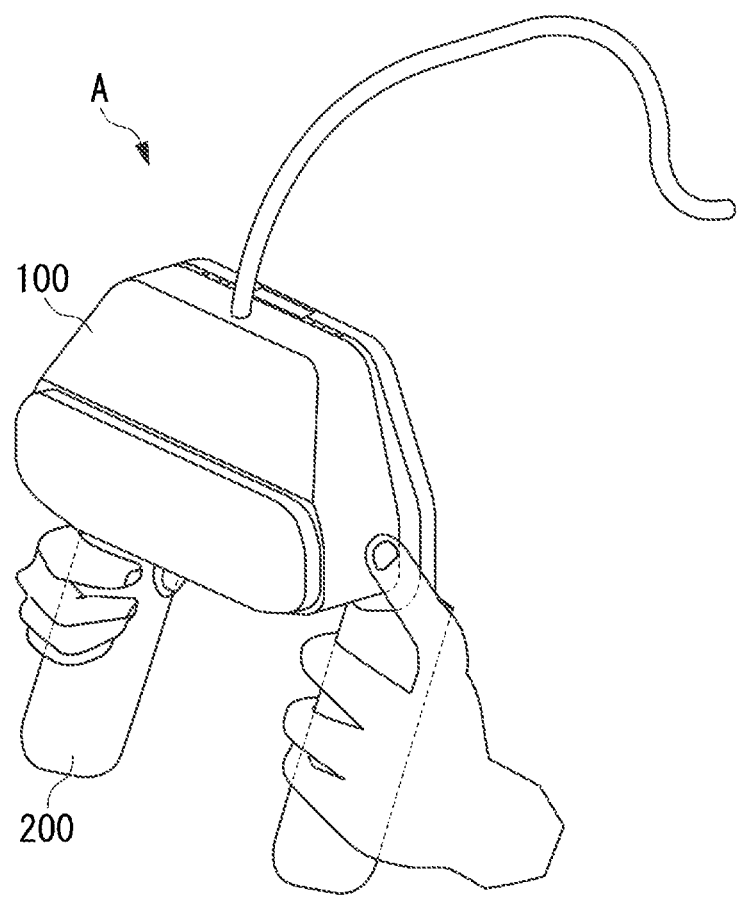
FIG. 1 is a diagram illustrating a handheld mode of a handheld display apparatus.

FIG. 1 illustrates a handheld mode of the handheld display apparatus according to the present exemplary embodiment. As illustrated in FIG. 1, the handheld mode refers to a state in which an imaging display unit 100 is coupled with a handheld unit 200. The imaging display unit 100 includes the imaging unit and the display unit, and can present an image captured by the imaging unit to the user by using the display unit. The handheld unit 200 includes a handheld grip portion including a plurality of bar members, and is gripped by the user. The imaging display unit 100 and the handheld unit 200 include an attachment/detachment mechanism (attachment/detachment unit) therebetween, and can be manually attached to and detached from each other.

The user can grip and hold the handheld unit 200 in the user's hands to view the image displayed on the imaging display unit 100 in front of the user's eyes without mounting the imaging display unit 100 on the user's head.

Figure 2:
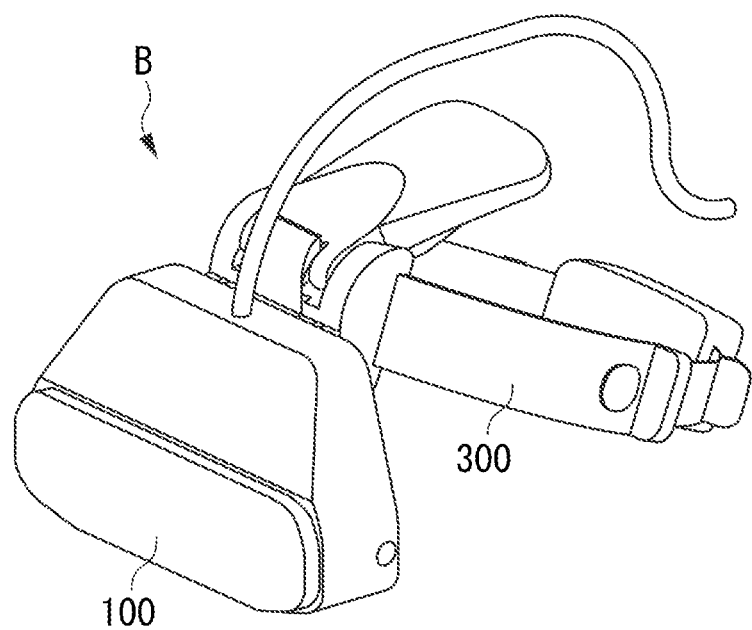
FIG. 2 is a diagram illustrating a head mounted mode of the handheld display apparatus.

FIG. 2 illustrates a head mounted mode of the handheld display apparatus according to the present exemplary embodiment. As illustrated in FIG. 2, the head mounted mode refers to a state in which the imaging display unit 100 is coupled with a head mount unit 300. The user can place the head mount unit 300 on the user's head to view the image displayed on the imaging display unit 100 in front of the user's eyes without the aid of the user's hands.

Figure 3A:
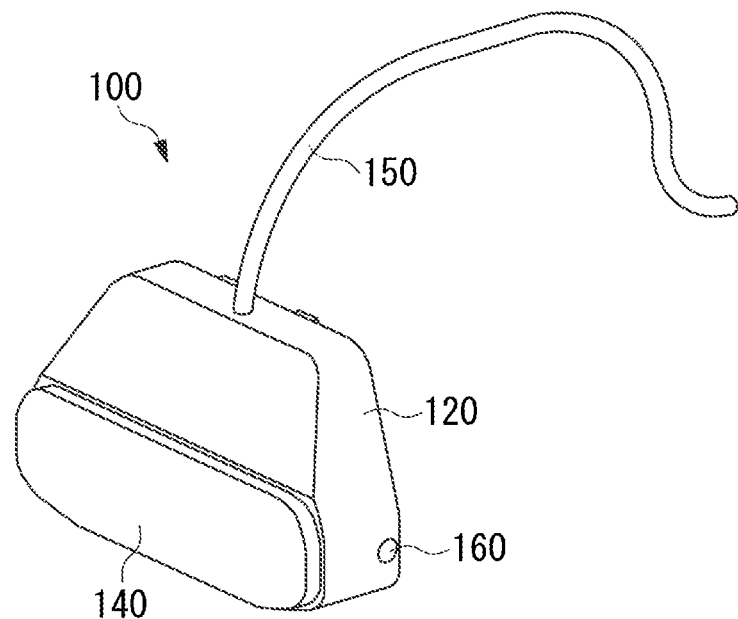
FIGS. 3A and 3B are diagrams each illustrating an appearance of the handheld display apparatus.
Figure 3B:
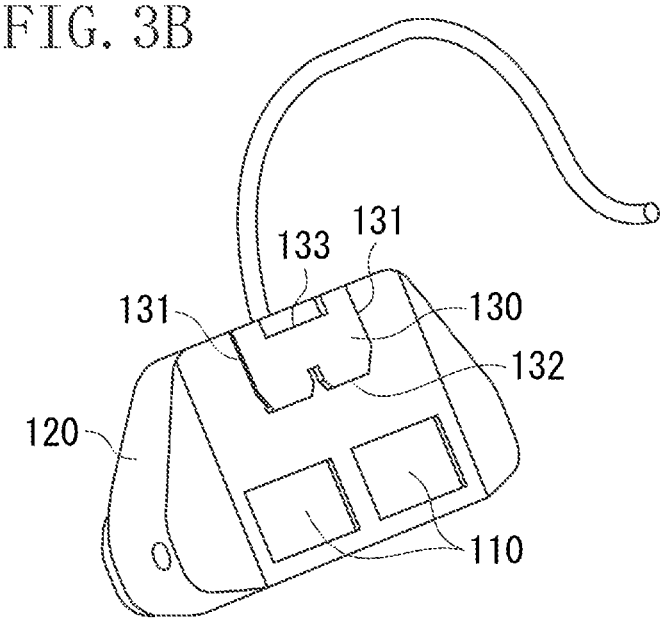

FIGS. 3A and 3B illustrate an appearance of the handheld display apparatus according to the present exemplary embodiment. FIG. 3A is a perspective view of the handheld display apparatus according to the present exemplary embodiment from the front. As illustrated in FIG. 3A, the handheld display apparatus according to the present exemplary embodiment includes the imaging display unit 100 including a built-in imaging unit, and the imaging display unit 100 includes a front cover 140, a rear cover 120, a cable 150, and a button 160. The front cover 140 is made of a transparent or semitransparent member or has a hole. With such a configuration, the imaging unit can capture an image of the real space in front via the front cover 140. The cable 150 is used to supply power to the imaging display unit 100 and perform communication with an external apparatus. If button 160 is manually operated by the user, a control signal is generated and various controls, such as a transition of a state of the imaging display unit 100, are performed. A position and function of the button 160 will be described in detail below.

FIG. 3B is a perspective view of the handheld display apparatus according to the present exemplary embodiment from behind the handheld display apparatus. As illustrated in FIG. 3B, the rear cover 120 occupies a large area of the rear side. Similar to the front cover 140, the rear cover 120 is made of a transparent or semitransparent member or has a hole. The user can view images displayed on display units 110 via the rear cover 120. The display units 110 may include a projection optical system and/or a reflection optical system in addition to display devices.

A first coupling unit 130 is arranged on the rear cover 120. The first coupling unit 130 includes first rails 131, a first support surface 132, and a first projection catch portion 133. The first coupling unit 130 is used in coupling the imaging display unit 100 with the handheld unit 200, or in coupling the imaging display unit 100 with the head mount unit 300. Details will be described below.

Figure 4A:
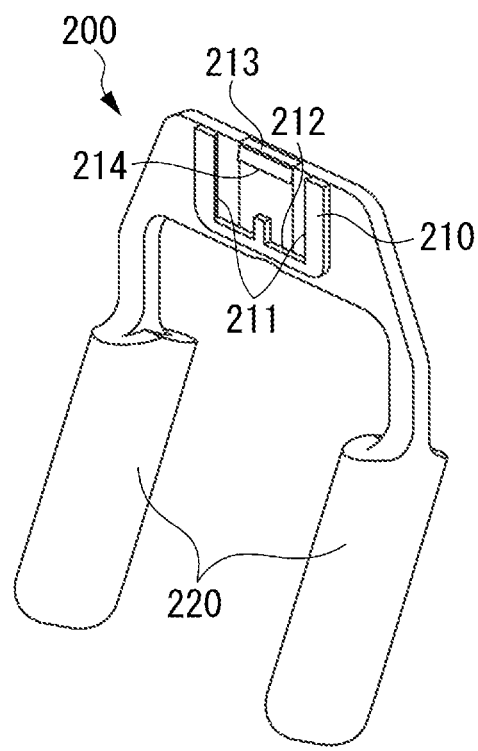
FIGS. 4A and 4B are diagrams each illustrating an appearance of a handheld unit used in the handheld mode.
Figure 4B:
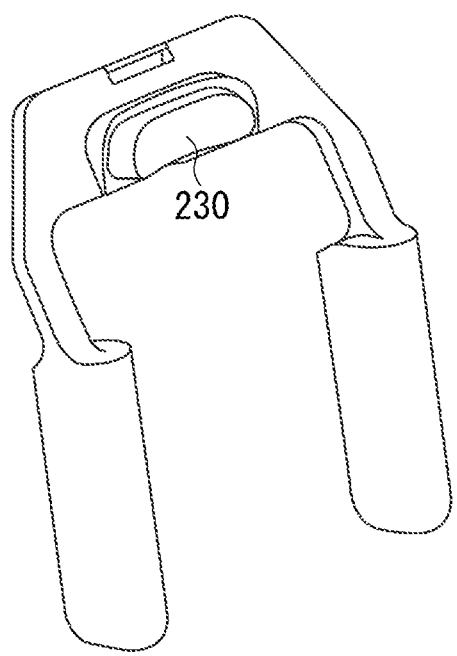

FIGS. 4A and 4B illustrate an appearance of the handheld unit 200 used in the handheld mode according to the present exemplary embodiment. FIG. 4A is a perspective view of the handheld unit 200 used in the handheld mode from a first point of view. The handheld unit 200 includes a second coupling unit 210 and a grip portion 220. The user can grip the grip portion 220 in both hands or in one hand. FIG. 4B is a perspective view of the handheld unit 200 used in the handheld mode from a point of view different from the first point of view. The user's head contacts the side illustrated in FIG. 4B. As illustrated in FIG. 4B, there is provided a second elastic member 230. If the user views the images displayed on the display units 110 of the imaging display unit 100, the user presses a portion of the user's forehead against the second elastic member 230. The elasticity of the elastic member 230 eases stress concentration on the forehead so that the usability for the user does not deteriorate. If the user grips the grip portion 220 and brings the user's forehead into contact with the second elastic member 230, the imaging display unit 100 is supported by two-points so that the positional relation between the imaging display unit 100 and the user's head is prevented from moving.

Next, operations for coupling and separating the imaging display unit 100 with and from the handheld unit 200 will be described.

As illustrated in FIG. 4A, the second coupling unit 210 includes second rails 211, a second support surface 212, a second lever 213, and a second projection 214.

Initially, to couple the imaging display unit 100 with the handheld unit 200, the imaging display unit 100 is moved above the handheld unit 200 and the first rails 131 are positioned above the second rails 211. The position of the imaging display unit 100 is then lowered with the first rails 131 and pressed against the second coupling unit 210. As a result, the first rails 131 and the second rails 211 engage with each other. The second projection 214 is an elastic member, or is elastically deformably supported by elastic force from another elastic member. When the imaging display unit 100 is further lowered with the first and second rails 131 and 211 engaged with each other, the second projection 214 is pushed to the side of the second elastic member 230 by the first coupling unit 130. When the imaging display unit 100 is further lowered with the second projection 214 pushed aside, the first support surface 132 comes into contact with the second support surface 212. With the first and second support surfaces 132 and 212 contacting each other, the second projection 214 pushed aside comes into the space above the first projection catch portion 133 by resilience. The second projection 214 and the first projection catch portion 133 are sloped in a direction of engaging with each other. The imaging display unit 100 and the handheld unit 200, if coupled, are firmly positioned by the engagement of the first and second rails 131 and 211 and the engagement of the second projection 214 and the first projection catch portion 133. With such an operation, the imaging display unit 100 and the handheld unit 200 can be coupled with each other.

Next, a case of separating the imaging display unit 100 and the handheld unit 200 will be described. The second lever 213 is used for the separation. When the second lever 213 is moved to a second elastic member 230 side by the user's finger, the second projection 214 exits the space over the first projection catch portion 133. When the imaging display unit 100 in such a state is moved upward from the handheld unit 200, the second projection 214 and the first projection catch portion 133 does not engage with each other. As a result, the imaging display unit 100 moves up while being guided by the first and second rails 131 and 211. When the imaging display unit 100 is kept moving, the first rails 131 and the second rails 211 are separated from each other. With such an operation, the imaging display unit 100 and the handheld unit 200 can be separated from each other.

Next, the position and function of the button 160 will be described in detail. As described above, the button 160 is an operation unit arranged in the position illustrated in FIG. 3A on the imaging display unit 100. In the handheld mode described in FIG. 1, the button 160 is located near the grip portion 220 of the handheld unit 200. Since the button 160 is located near the grip portion 220, the user can touch the button 160 with the user's forefinger while gripping the grip portion 220 as illustrated in FIG. 1. Consequently, the user can operate the button 160 while viewing the display units 110 without releasing any hands from the grip portion 220. Since the user can perform a button operation without releasing any hands, the handheld display apparatus is less likely to be accidentally dropped. During the button operation, the user's finger is less likely to cross in front of the front cover 140 of the imaging display unit 100 and appear in the captured image. In the foregoing description, while one button 160 is provided, in other exemplary embodiments, a plurality of buttons may be arranged, for example, near the position illustrated in FIG. 3A. The user viewing the display units 110 may operate the button 160 without looking at the button 160. To that end, the button 160 is projected or depressed so that the user can feel the presence of the button 160 by simply touching it. The button 160 may be a button other than a push button, such as, but not limited to, a latch switch, a slide switch, a stick, a touch panel, etc., and may be appropriately selected and arranged according to functions.

Various functions can be assigned to the button 160. A first function is to power on/off the imaging display unit 100. For example, the button 160 may have a function of powering on the imaging display unit 100 if the button 160 is pressed or kept pressed for several seconds when the power of the imaging display unit 100 is off. Alternatively, the button 160 may have a function of powering off the imaging display unit 100 if the button 160 is pressed or kept pressed for several seconds when the power of the imaging display unit 100 is on. A second function is to switch on/off the display units 110.

For example, the display devices of the display units 110 are frequently turned off as appropriate to conserve power. The button 160 can have a function of turning on the display devices of the display units 110 if the button 160 is pressed. The user can turn on the display units 110 by pressing the button 160 only when the user wishes to view the display units 110, thereby reducing the turn-on time. If operating the button 160 each time is troublesome, the display units 110 may be automatically turned off when a predetermined time elapses. In such a case, the button 160 is only used to switch on the display units 110. A third function is to change internal parameters of the imaging display unit 100. The internal parameters refer to parameters that include, but are not limited to, determining brightness and contrast of the display unit 110, and controlling aperture, sensitivity, and focusing of the imaging unit. The internal parameters can include whether to superimpose a virtual object or scene on the real scene. For example, if the button 160 is pressed, a graphical user interface (GUI) is displayed on the display unit 110. In one exemplary embodiment, the user can change the internal parameters while viewing the GUI by combining a plurality of button operations.

Other Exemplary Embodiments

Figure 5C:
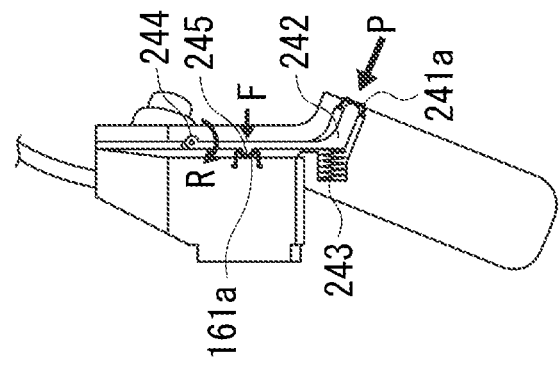
FIGS. 5A, 5B, and 5C are diagrams each illustrating a mechanism for mechanically transmitting an operation performed on buttons on a handheld unit.
Figure 5B:
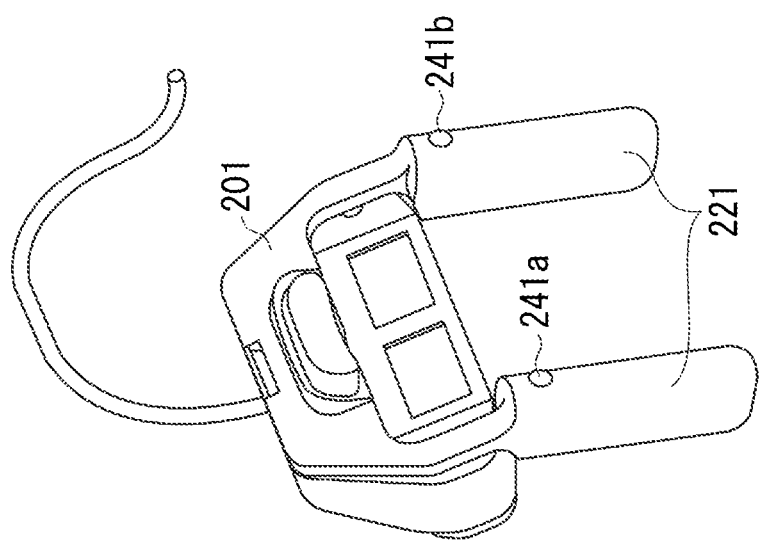
Figure 5A:
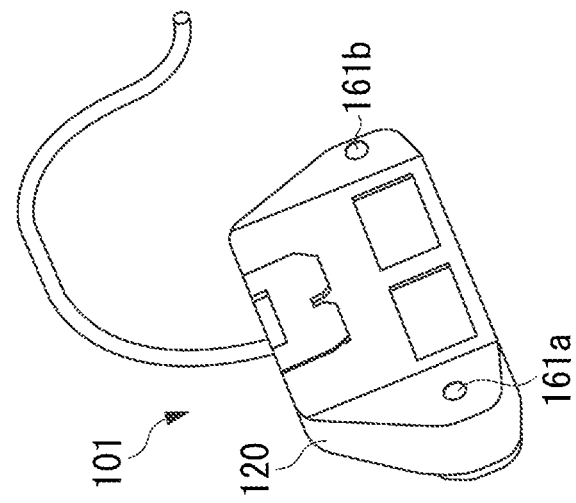

Next, another exemplary embodiment will be described. FIGS. 5A, 5B, and 5C illustrate a mechanism for mechanically transmitting an operation performed on buttons on a handheld unit. A method for coupling and separating an imaging display unit 101 and a handheld unit 201 illustrated in FIGS. 5A, 5B, and 5C is substantially the same as the method described above that is associated with the imaging display unit 100 and the handheld unit 200.

FIG. 5A is a perspective view of the imaging display unit 101. The imaging display unit 101 includes a button 161a and a button 161b in the positions illustrated in FIG. 5A. FIG. 5B is a perspective view of the handheld unit 201. The handheld unit 201 includes a button 241a and a button 241b in the positions illustrated in FIG. 5B. The user can operate the buttons 241a and 241b while gripping a grip portion 221.

FIG. 5C is a sectional side view when the imaging display unit 101 is coupled with the handheld unit 201. As illustrated in the diagram, the mechanism includes the button 241a, a link 242, a compression spring 243, a rotation shaft 244, a projection 245, and the button 161a. Such a mechanism can convert a force used to press the button 241a into a force that presses the button 161a. More specifically, the link 242 is pressed against the button 241a when receiving resilience of the compression spring 243.

When the user presses the button 241a in the direction P in FIG. 5C, the force is conveyed to the link 242. The link 242 rotates about the rotation shaft 244 in the direction R in FIG. 5C while further compressing the compression spring 243. With the rotation, the projection 245 presses the button 161a. When the button 161a is pressed, a control signal is generated and, for example, the state of the imaging display unit 101 transitions. The user can visually observe the state transition, and, for example, release the user's finger from the button 241a. If the user's finger is released, the link 242 returns to the original position by the resilience of the compression spring 243. At the same time, the pressing of the button 161a is also released. In other words, the user, through the link mechanism, can perform a button operation on the imaging display unit 101 while viewing the display unit 110 without releasing any hands from the grip portion 221.

Figure 6C:
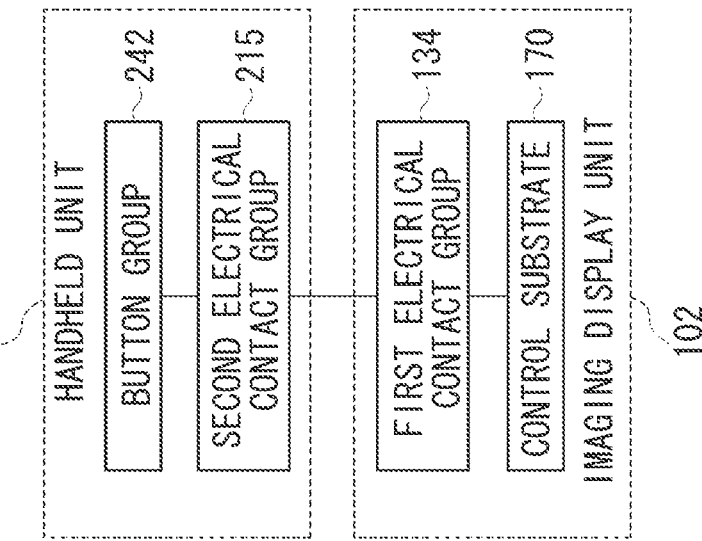
FIGS. 6A, 6B, and 6C are diagrams illustrating a mechanism for electrically transmitting an operation performed on buttons on a handheld unit in a wired manner.
Figure 6B:
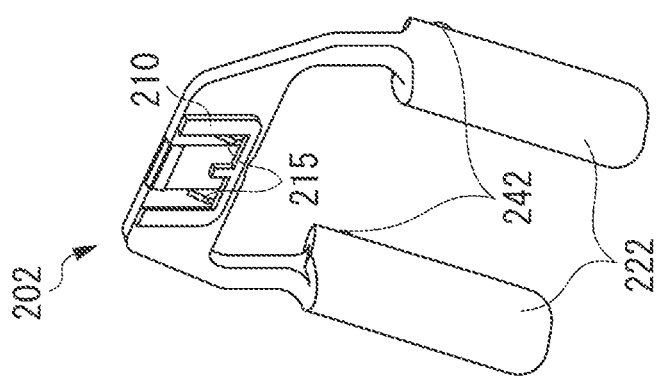
Figure 6A:
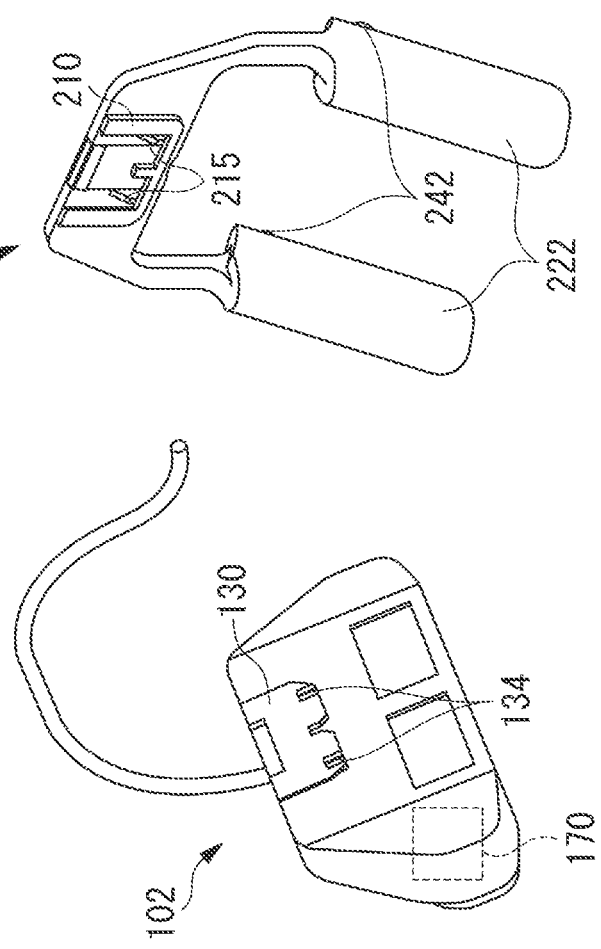

FIGS. 6A, 6B, and 6C illustrate a mechanism for transmitting an operation performed on buttons on a handheld unit via a wired connection.

An imaging display unit 102 and a handheld unit 202 will be described below. A method for coupling and separating the imaging display unit 102 and the handheld unit 202 is substantially the same as the method described above that is associated with the imaging display unit 100 and the handheld unit 200.

FIG. 6A is a perspective view of the imaging display unit 102. The imaging display unit 102 includes a first coupling unit 130. The first coupling unit 130 includes a first electrical contact group 134. The imaging display unit 102 further includes a built-in control substrate 170. The control substrate 170 controls a video output to display units 110 and accepts a control signal generated by a button operation.

FIG. 6B is a perspective view of the handheld unit 202. The handheld unit 202 includes a second coupling unit 210. The second coupling unit 210 includes a second electrical contact group 215. The handheld unit 202 further includes a button group 242 in the positions illustrated in FIG. 6B. The user can operate the button group 242 without releasing the user's hands from a grip portion 222 and without viewing the display units.

FIG. 6C is a block diagram illustrating an electrical configuration when the imaging display unit 102 is coupled with the handheld unit 202. If the imaging display unit 102 and the handheld unit 202 are coupled via the first coupling unit 130 and the second coupling unit 210, the first electrical contact group 134 contacts the second electrical contact group 215. The contact between the first electrical contact group 134 and the second electrical contact group 215 establishes a wired connection between the button group 242 and the control substrate 170. An electrical signal indicating information that the user has pressed the button group 242 is transmitted to the control substrate 170 via the first electrical contact group 134 and the second electrical contact group 215 (wired communication). As a result, the user can perform a button operation on the imaging display unit 102 while viewing the display units 110 without releasing either one of the user's hands from the grip portion 222.

FIGS. 7A, 7B, and 7C illustrate a mechanism for wirelessly transmitting an operation of buttons on a handheld unit. An imaging display unit 103 and a handheld unit 203 will be described. A method for coupling and separating the imaging display unit 103 and the handheld unit 203 is substantially the same as the method described above that is associated with the imaging display unit 100 and the handheld unit 200.

FIG. 7A is a perspective view of the imaging display unit 103. A control substrate 170 and a receiver 180 are built into the imaging display unit 103. The control substrate 170 controls a video output to display units 110 and accepts an electrical signal generated by a button operation. The receiver 180 can wirelessly receive a control signal from a transmitter 250 (described below).

FIG. 7B is a perspective view of the handheld unit 203. The handheld unit 203 includes a button group 243 in the positions illustrated in FIG. 7B. A transmitter 250 and a power supply 260 are built into the handheld unit 203. The user can operate the button group 243 while gripping a grip portion 223. The transmitter 250 can wirelessly transmit a control signal to the foregoing receiver 180. The power supply 260 supplies power to the transmitter 250.

FIG. 7C is a block diagram illustrating an electrical configuration of the imaging display unit 103 and the handheld unit 203. The transmitter 250 and the receiver 180 are connected via wireless communication. When the user presses any one of the button group 243, an electrical signal (i.e., a control signal) is generated. This control signal is transmitted to the control substrate 170 via the wireless communication between the transmitter 250 and the receiver 180. In other words, the user can control the imaging display unit 103 by operating a button while viewing the display units 110 without releasing any of the user's hands from the grip portion 223.

As described above, the handheld display apparatus according to an exemplary embodiment enables a user to easily perform a button operation. The user can thus easily issue a control instruction to the handheld display apparatus that includes the display units for displaying an image to the user. In addition, the handheld display apparatus can be easily switched to a head mounted apparatus.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

What is claimed is:

1. A handheld display apparatus including a display unit configured to display an image, the handheld display apparatus comprising:
    a contact portion arranged in proximity to the display unit and configured to contact a head of a user;
    a handheld grip portion including a plurality of members to be gripped by the user and an attachment/detachment unit configured to enable the handheld grip portion to be attached to and detached from right and left sides of the display unit; and
    an operation unit configured to receive a manual operation and to generate a control signal for the handheld display apparatus, the operation unit being arranged in proximity to at least one of the right and left sides of the display unit.

2. The handheld display apparatus according to claim 1, wherein the attachment/detachment unit includes a rail member, and wherein the handheld grip portion is configured to be attached to and detached from the display unit by engagement of the rail member.

3. The handheld display apparatus according to claim 1, wherein the attachment/detachment unit includes a lever member, and wherein the handheld grip portion is configured to be attached to and detached from the display unit by an operation performed on the lever member.

4. The handheld display apparatus according to claim 1, wherein the display unit includes a coupling unit configured to enable the display unit to couple with a head mount unit.

5. The handheld display apparatus according to claim 1,
    wherein the operation unit is arranged on the plurality of members,
    wherein the manual operation is transmitted to the display unit through a link mechanism, and
    wherein the display unit is configured to receive the transmitted manual operation and generate the control signal.

6. The handheld display apparatus according to claim 1,
    wherein the operation unit is arranged on the plurality of members,
    wherein information about the manual operation is transmitted to the display unit as an electrical signal via wired communication, and
    wherein the display unit is configured to receive the transmitted information about the manual operation and generate the control signal.

7. The handheld display apparatus according to claim 1,
    wherein the operation unit is arranged on the plurality of members,
    wherein information about the manual operation is transmitted to the display unit as an electrical signal via wireless communication, and
    wherein the display unit is configured to receive the transmitted information about the manual operation and generate the control signal.

8. The handheld display apparatus according to claim 1, wherein the operation unit includes a button that is in a projected or depressed state relative to the operation unit.

9. The handheld display apparatus according to claim 1, wherein the operation unit includes at least any one of a latch switch, a slide switch, a stick, or a touch panel.

10. The handheld display apparatus according to claim 1, further comprising a control unit configured to, in a case where a button is pressed, cause the display unit to display an image.

11. The handheld display apparatus according to claim 1, wherein the contact portion is an elastic member.

12. A display apparatus including a display unit configured to display an image, the display apparatus comprising:
a contact portion arranged in proximity to the display unit and configured to contact a head of a user;
an attachment/detachment unit configured to enable a handheld grip portion including a plurality of members to be gripped by the user to be attached to and detached from right and left sides of the display unit; and
an operation unit configured to receive a manual operation and to generate a control signal for the display apparatus, the operation unit being arranged in proximity to at least one of the right and left sides of the display unit.

13. The display apparatus according to claim 12, wherein the display unit includes a coupling unit configured to enable the display unit to couple with a head mount unit.

14. The display apparatus according to claim 12, wherein the operation unit includes a button that is in a projected or depressed state relative to the operation unit.

15. The display apparatus according to claim 12, wherein the operation unit includes at least any one of a latch switch, a slide switch, a stick, or a touch panel.

16. The display apparatus according to claim 12, further comprising a control unit configured to, in a case where a button is pressed, cause the display unit to display an image.

17. The display apparatus according to claim 12, wherein the contact portion is an elastic member.

18. The display apparatus according to claim 12, wherein the attachment/detachment unit is configured to enable a head mount unit to be attached to and detached from the display unit, and wherein the head mount unit can be placed on the head of the user.

19. A handheld apparatus comprising:
an attachment/detachment unit configured to enable a handheld grip portion including a plurality of members to be gripped by the user to be attached to and detached from right and left sides of a display unit including a contact portion arranged in proximity to the display unit and configured to contact a head of a user; and
an operation unit configured to receive a manual operation and to generate a control signal for the display unit, the operation unit being arranged in the proximity to at least one of the right and left sides of the display unit.

20. The handheld apparatus according to claim 19, wherein the attachment/detachment unit is configured to enable a head mount unit to be attached to and detached from the display unit, and wherein the head mount unit can be placed on the head of the user.

21. A handheld display apparatus including a display unit configured to display an image, the handheld display apparatus comprising:
a contact portion arranged in proximity to the display unit and configured to contact a head of a user;
a handheld grip portion including a member to be gripped by the user and an attachment/detachment unit configured to enable the handheld grip portion to be attached to and detached from the display unit; and
an operation unit configured to receive a manual operation and to generate a control signal for the handheld display apparatus, the operation unit being arranged in proximity to the display unit.

22. The handheld display apparatus according to claim 21, further comprising a control unit configured to, in a case where a button is pressed, cause the display unit to display an image.

23. The handheld display apparatus according to claim 21, wherein the contact portion is an elastic member.

24. A display apparatus including a display unit configured to display an image, the display apparatus comprising:
a contact portion arranged in proximity to the display unit and configured to contact a head of a user;
an attachment/detachment unit configured to enable a handheld grip portion including a member to be gripped by the user to be attached to and detached from the display unit; and
an operation unit configured to receive a manual operation and to generate a control signal for the display apparatus, the operation unit being arranged in proximity to the display unit.

25. The display apparatus according to claim 24, further comprising a control unit configured to, in a case where a button is pressed, cause the display unit to display an image.

26. The display apparatus according to claim 24, wherein the contact portion is an elastic member.

27. The display apparatus according to claim 24, wherein the attachment/detachment unit is configured to enable a head mount unit to be attached to and detached from the display unit, and wherein the head mount unit can be placed on the head of the user.

* * * * *